Sturdevant & Harmon.
Removing Tin from Sheet Metal.
No. 3,258. Reissued Jan. 5, 1869.
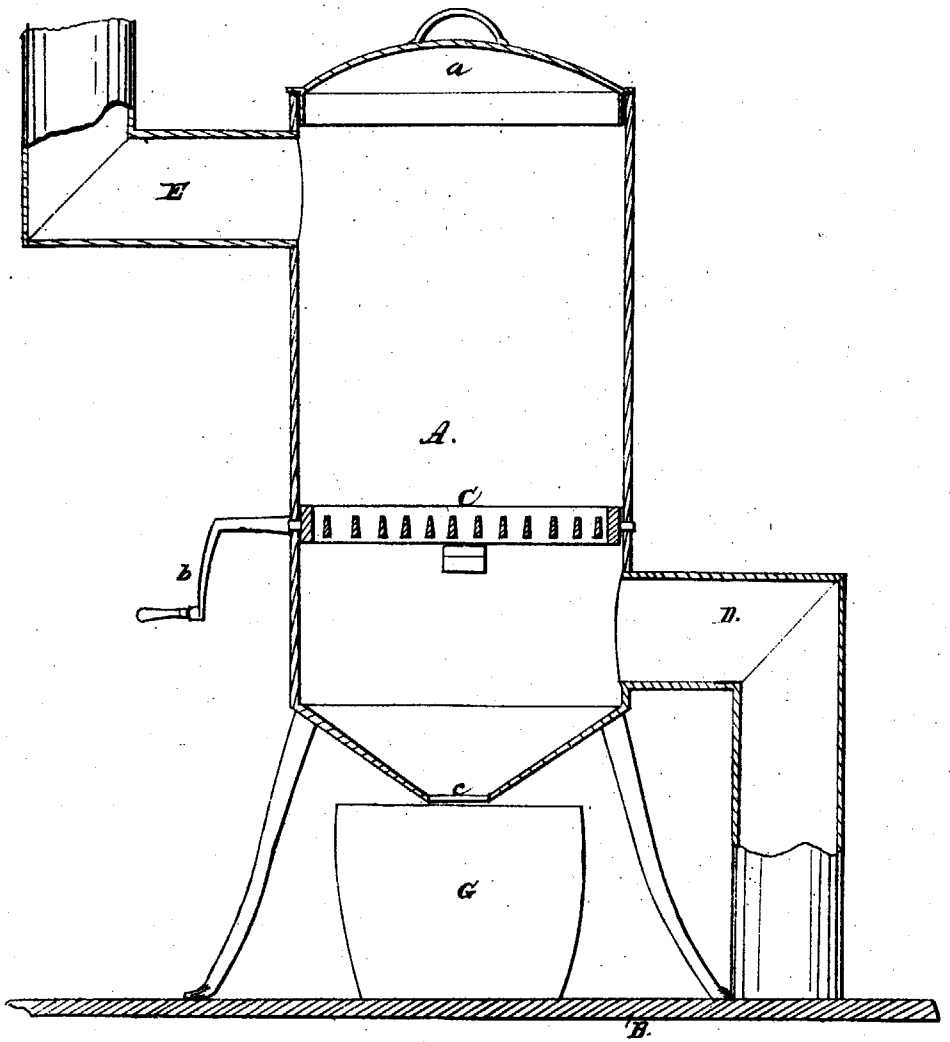
Witnesses:
J. R. Dake
Geo. W. Mott.
Inventor:
D. B. Sturdevant &
R. H. Harmon by
J. Tarson & Co
Attys United States Patent Office.

D. B. STURDEVANT AND B. H. HARMON, OF CLIFTON SPRINGS, NEW YORK.

*Letters Patent No.* 75,809, *dated March* 24, 1868; *reissue No.* 3,258, *dated January* 5, 1869.

IMPROVED PROCESS OF REMOVING TIN FROM SHEET-METAL.

The Schedule referred to in these Letters Patent and making part of the same.

*To all whom it may concern:*

Be it known that we, D. B. STURDEVANT and B. H. HARMON, of Clifton Springs, in the county of Ontario, and State of New York, have invented a certain new and useful Method of Removing Tin Coatings from Sheet-Metal; and we do hereby declare the following to be a full and exact description of the same, reference being had to the accompanying drawings, making part of this specification.

The figure represents a central vertical section of an apparatus employed for carrying the said invention into effect.

The object of this improvement is to remove tin coatings from sheet-metal, such, for instance, as tin scraps and old tin-ware, &c.

This invention consists in the combined use of hot air and steam or gases, or either, for softening the coating; also, in connection therewith, the employment of mechanical agitation for loosening and detaching the coatings from the scraps, as hereinafter set forth.

The apparatus herein shown consists of a retort, having induction and eduction-air passages, a shaking grate, and a contracted bottom, employed in connection with a water-receptacle beneath, for the generation of the steam.

In the drawings, A indicates the retort, which may rest upon a furnace, B, or be otherwise connected with any apparatus by which heat may be imparted.

It has a cover, *a*, which is removed for the insertion of the sheet-metal, and is also provided with a grate, C, for sustaining the metal, and for allowing free passage of the hot air and steam through it.

This grate is hung upon journals, and is thus made to shake freely in the retort by means of a hand-crank, *b*, extending out through the sides.

An induction hot-air pipe, D, opens beneath the grate, and an eduction-pipe, E, extends from above it.

The bottom of the retort is in funnel-form, and has a small opening, *c*, as shown, and beneath this opening rests a water-receptacle, G, for the generation of steam.

The operation is as follows:

The scraps of sheet-metal are placed upon the grate, and hot air let on through pipe D, and steam through orifice C. When heated, the grate is shaken, and the particles of tin, as they are melted, fall down through the open bottom into the receptacle beneath. While this action is taking place, the loose grate allows the mass to be thoroughly agitated, which is essential in the process to produce a thorough removal of the tin.

What we claim as our invention, and desire to secure by Letters Patent, is—

1. The process herein described of removing coatings from sheet-metal, by the combined use of hot air and steam, acting upon the mass in a closed retort, substantially as herein set forth.

2. The process herein described of removing tin coatings from sheet-metal, by agitating the metal while subjected to heat.

3. The process herein described of removing tin coatings from sheet-metal, by jarring or agitating the metal while subjected to the combined action of hot air and steam or gases in a closed vessel or retort, substantially as herein set forth.

4. The combination, with a retort provided with a vibratory grate, or equivalent, of an induction-pipe below the grate, and an eduction-pipe above the grate, for the admission of hot air, steam, or gases through the mass, supported by the grate, whether combined or not with water-receptacle, as and for the purposes shown and described.

In testimony whereof, we have signed our names to this specification, before two subscribing witnesses.

D. B. STURDEVANT.
B. H. HARMON.

Witnesses:
JOHN J. VAN ALLEN,
DAN'L JACKSON.